United States Patent
Su et al.

(10) Patent No.: US 12,412,927 B2
(45) Date of Patent: Sep. 9, 2025

(54) IN-SITU POLYMERIZED POLYMER ELECTROLYTE FOR LITHIUM ION BATTERIES

(71) Applicant: Evonik Operations GmbH, Essen (DE)

(72) Inventors: Shasha Su, Shanghai (CN); Jinhua Jiang, Shanghai (CN); Jing Feng, Shanghai (CN); Hongping Li, Shanghai (CN); Huichao Lu, Shanghai (CN); Zhixin Xu, Shanghai (CN); Jun Yang, Shanghai (CN)

(73) Assignee: Evonik Operations GmbH, Essen (DE)

( * ) Notice: Subject to any disclaimer, the term of this patent is extended or adjusted under 35 U.S.C. 154(b) by 769 days.

(21) Appl. No.: 17/616,932

(22) PCT Filed: Jun. 6, 2019

(86) PCT No.: PCT/CN2019/090337
§ 371 (c)(1),
(2) Date: Dec. 6, 2021

(87) PCT Pub. No.: WO2020/243948
PCT Pub. Date: Dec. 10, 2020

(65) Prior Publication Data
US 2022/0344712 A1   Oct. 27, 2022

(51) Int. Cl.
*H01M 10/0565* (2010.01)
*C08L 33/08* (2006.01)
(Continued)

(52) U.S. Cl.
CPC ......... *H01M 10/0565* (2013.01); *C08L 33/08* (2013.01); *C08L 37/00* (2013.01);
(Continued)

(58) Field of Classification Search
CPC ......... H01M 10/0565; H01M 10/0525; H01M 2300/0082; H01M 2300/0085; C08L 33/08; C08L 37/00
See application file for complete search history.

(56) References Cited

U.S. PATENT DOCUMENTS

| | | | |
|---|---|---|---|
| 2003/0104282 A1 | 6/2003 | Xing et al. | |
| 2005/0069766 A1* | 3/2005 | Takahashi | H01M 4/587 429/189 |

(Continued)

FOREIGN PATENT DOCUMENTS

| | | |
|---|---|---|
| CN | 1555591 A | 12/2004 |
| CN | 101195670 A | 6/2008 |

(Continued)

OTHER PUBLICATIONS

KR-20190019026 MT.*

(Continued)

*Primary Examiner* — Alexander Usyatinsky
(74) *Attorney, Agent, or Firm* — Michael Best & Friedrich LLP

(57) ABSTRACT

Monomers for preparing a polymer electrolyte precursor composition capable to form an in-situ polymerized polymer electrolyte, which comprise, consist essentially of, or consist of A1) a first monomer and A2) a second monomer. A polymer electrolyte precursor raw material composition, a polymer electrolyte precursor composition capable to form a polymer electrolyte comprising the monomers, a polymer electrolyte and an electrochemical device are also provided.

21 Claims, 4 Drawing Sheets

(51) Int. Cl.
*C08L 37/00* (2006.01)
*H01M 10/0525* (2010.01)

(52) U.S. Cl.
CPC .............. *H01M 10/0525* (2013.01); *H01M 2300/0082* (2013.01); *H01M 2300/0085* (2013.01)

(56) References Cited

U.S. PATENT DOCUMENTS

| | | | |
|---|---|---|---|
| 2007/0141461 A1* | 6/2007 | Lin | H01B 1/122 429/231.95 |
| 2011/0256456 A1 | 10/2011 | Jeon et al. | |
| 2012/0225958 A1 | 9/2012 | Wang et al. | |
| 2014/0186673 A1 | 7/2014 | Kwon et al. | |
| 2014/0255772 A1 | 9/2014 | Kyu et al. | |
| 2015/0244026 A1* | 8/2015 | Chen | H01M 10/0525 429/303 |
| 2017/0288255 A1 | 10/2017 | Kim et al. | |
| 2018/0034101 A1 | 2/2018 | Lee et al. | |
| 2019/0036162 A1 | 1/2019 | Oh et al. | |

FOREIGN PATENT DOCUMENTS

| | | | |
|---|---|---|---|
| CN | 103872379 A | | 6/2014 |
| CN | 105702919 A | | 6/2016 |
| CN | 108155354 A | | 6/2018 |
| CN | 109103488 A | | 12/2018 |
| CN | 109346767 A | | 2/2019 |
| EP | 0647663 A1 | | 4/1995 |
| JP | 2000306604 A | | 11/2000 |
| JP | 2000319531 A | | 11/2000 |
| JP | 2005011820 A | | 1/2005 |
| JP | 2013175475 A | | 9/2013 |
| KR | 20080058197 A | | 6/2008 |
| KR | 20140083023 A | | 7/2014 |
| KR | 20190019026 A | * | 2/2019 |
| WO | 2013059769 A1 | | 4/2013 |
| WO | 2018190665 A1 | | 10/2018 |

OTHER PUBLICATIONS

X. Zhang et al. Electrochimica Acta 301 (2019) 304-311 (Year: 2019).*
The decision of KPO to grant a Patent for Application 10-2022-70001177 (Year: 2025).*
Fan et al., "Research progress in on-site polymerization preparation of gel polymer electrolyte for lithium-ion batteries", Journal of the Chinese Ceramic Society, issue 02, Jan. 25, 2013, pp. 12-17.
Michiyuki Kono et al., "Chemical and Electrochemical Characterization of Polymer Gel Electrolytes Based on a Poly (alkylene oxide) Macromonomer for Application to Lithium Batteries" Journal of The Electrochemical Society, vol. 147, issue 7, pp. 240-8501.
Japanese Patent Office Action for Application No. 2021-572001 dated Aug. 29, 2023 (7 pages including English translation).
Chinese Patent Office Action and search report for Application No. 201980098870.8 dated Aug. 16, 2023 (20 pages including English translation).
International Search Report and Written Opinion for Application No. PCT/CN2019/090337 dated Mar. 17, 2020 (8 pages, English translation included).
Chai et al., "In Situ Generation of Poly (Vinylene Carbonate) Based Solid Electrolyte with Interfacial Stability for LiCoO2 Lithium Batteries," Adv. Sci. 2017, 4, 1600377.
Chai et al., "A Superior Polymer Electrolyte with Rigid Cyclic Carbonate Backbone for Rechargeable Lithium Ion Batteries," ACS Appl. Mater. Interfaces 2017, 9, 17897-17905.
European Patent Office Extended European Search Report for application 19932110.0, dated Feb. 1, 2023 (8 pages).

* cited by examiner

IN-SITU POLYMERIZED POLYMER ELECTROLYTE FOR LITHIUM ION BATTERIES

CROSS-REFERENCE TO RELATED APPLICATION

This patent application is the U.S. national stage entry, under 35 U.S.C. § 371, of International Application Number PCT/CN2019/090337, filed Jun. 6, 2019, the entire contents of which are hereby incorporated by reference.

TECHNICAL FIELD

The present invention relates to an in-situ polymerized polymer electrolyte using e.g. cellulose separator for lithium metal batteries.

BACKGROUND ART

Lithium ion batteries (LIBs) are widely used in portable electronic devices, electric vehicles (EVs), hybrid electric vehicles (HEVs) and energy storage systems. However, with the development and requirement of various energy storage devices and systems, there is in urgent need of high-energy-density storage systems. Lithium metal-based batteries (LMBs) are an ideal anode candidate as it can offer the highest theoretical specific capacity (3860 mAh $g^{-1}$) and the lowest redox potential (−3.04 V vs the standard hydrogen electrode). Unfortunately, the uncontrolled formation and growth of lithium dendrites and mossy metal deposits during lithium plating/striping process may lead to potential safety issues, continuous decomposition of electrolyte, continuous breakdown/reconstruction of solid electrolyte interface (SEI) and low Coulombic efficiency (CE). Replacing the liquid electrolyte with polymer electrolyte or solid polymer electrolyte can effectively suppress the lithium dendrite growth and eliminate the safety issues such as fire, explosion, and electrolyte leakage. However, solid polymer electrolyte has poor ionic conductivity at room temperature and the high interfacial resistance, which is hard to satisfy the practical application requirements.

Polymer electrolyte which combines the advantages of liquid electrolyte and solid electrolyte greatly shows ideal ionic conductivity, excellent electrochemical performance at room temperature and no leakage of liquid. More importantly, polymer electrolyte can use rigid skeleton possessing good mechanical strength to suppress Li dendrite growth in recent research.

However, traditional preparation process of polymer electrolyte consumes a large amount of solvents, which is costly, complicated and a severe obstacle to the development of polymer electrolyte. In-situ polymerization is a solvent-free hot-pressing method and simple but powerful technology for polymer electrolyte LMBs, which avoids solvents consuming and tedious preparation process.

In-situ polymer electrolyte is thermally prepared by precursor solution which consists of organic solvent, lithium salt, polymerable monomer and thermal initiator. Different monomers have different effects on the electrolyte system. Vinylene carbonate (VC) can be polymerized into poly(vinylenecarbonate) (PVCA) which has superior mechanical property, wide-electrochemical stability window and excellent interfacial compatibility with electrode as a main ingredient in the solid electrolyte interface (SEI). Besides, a cross-linking agent can facilitate the monomer polymerization at low content. The combination of VC and cross-linking agent could form an excellent polymer skeleton. Furthermore, cellulose membrane which possesses large number of micron pores, good mechanical strength and elasticity has broad application prospect in the in-situ polymerization. Thinner cellulose membrane has smaller lithium ion transmission resistance, which is more appropriate to achieve better battery performance.

J. Chai et al. (J. Chai et al. Advance Science, Vol. 4(2016), pp. 1600377) manifested that poly(vinylene carbonate) (PVCA) based solid polymer electrolyte possess electrochemical stability window up to 4.5 V versus Li/Li$^+$ and ionic conductivity of 9.82×10$^{-5}$ S cm$^{-1}$ at 50° C. for LiCoO$_2$/Li batteries. The LiCoO$_2$/Li battery only delivered reversible capacity of about 97 mAh g$^{-1}$ at a current density of 0.1 C, which was due to the low ionic conductivity of PVCA-SPE and large polarization at 25° C.

Further, J. Chai et al (J. Chai et al. ACS Apply Material Interfaces, Vol. 9 (2017), pp 17897-17905) developed a PVCA-based polymer electrolytes via a facile in situ polymerization method, which possesses an ionic conductivity of 5.59×10$^{-4}$ S cm$^{-1}$ and electrochemical stability window for 4.8 V vs Li$^+$/Li at ambient temperature, and delivered capacity retention (88.7%) after 1000 cycles at 1.0 C for LiFe$_{0.2}$Mn$_{0.8}$PO$_4$/graphite lithium ion batteries. Here graphite was used as anode.

SUMMARY OF THE INVENTION

It is therefore an object of the present invention to develop a novel polymer electrolyte by in-situ polymerization.

The inventors surprisingly found that different monomers, e.g. unsaturated carbonated ester monomer and trimethylolpropane ethoxylate triacrylate may form an excellent polymer skeleton for polymer electrolyte, which shows excellent performance such as cycle performance and electrochemical stability window as compared with commercial liquid electrolytes when using lithium metal as anode.

BRIEF DESCRIPTION OF DRAWINGS

FIG. 5(b) and FIG. 5(c) are enlarged views of the lower left corner of FIG. 5(a).

DETAILED DESCRIPTION OF THE INVENTION

Figure 1:
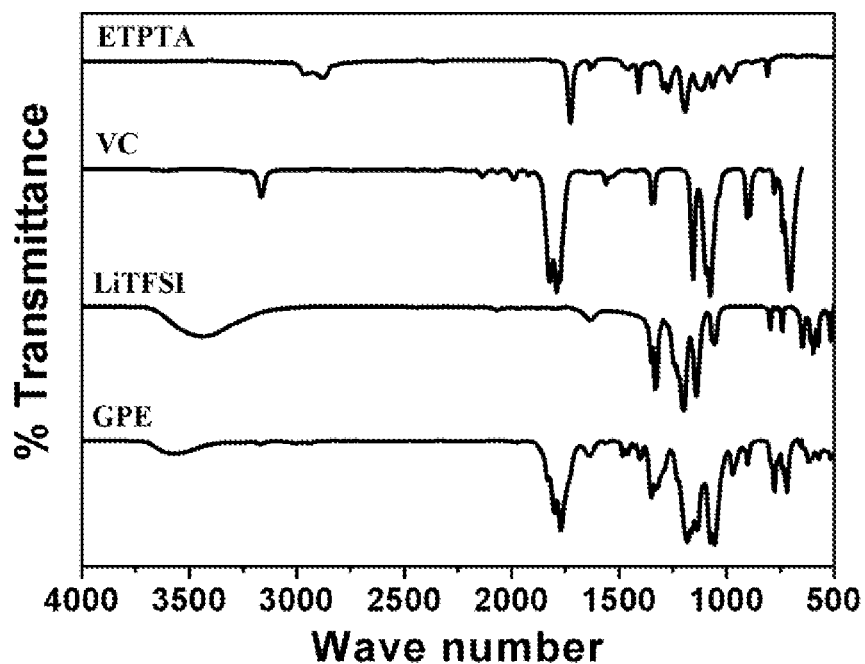
FIG. 1 shows the infrared test results proving that VC and trimethylolpropane ethoxylate triacrylate (ETPTA) had reacted completely according to Example 1.

The present invention provides monomers (i.e. a monomer composition or a composition of monomers) for preparing a polymer electrolyte precursor composition capable to form an in-situ polymerized polymer electrolyte, which comprise, consist essentially of, or consist of: A1) a first monomer, which is an unsaturated carbonated ester monomer, preferably a monomer represented by formula (I), more preferably vinylene carbonate (VC);

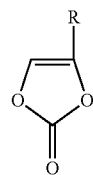

wherein R represents H, F, methyl or ethyl; and

A2) a second monomer, represented by formula (II), preferably trimethylolpropane ethoxylate triacrylate (ETPTA);

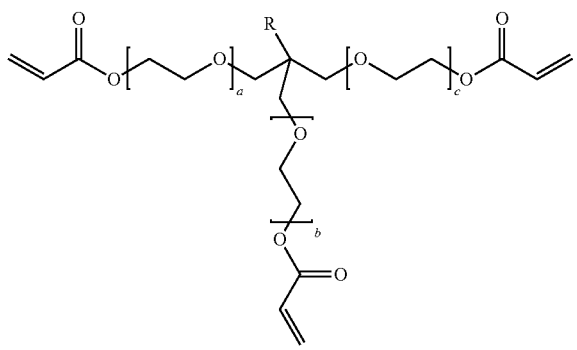

wherein R represents methyl, —$CH_2OH$, ethyl, or —$CH_2CH_2OH$, preferably R represents methyl, —$CH_2OH$ or ethyl; a, b, c each independently represents 0, 1, 2 or 3, and a+b+c≥2, preferably a+b+c≥3.

Using the monomers, a polymer electrolyte precursor composition may be prepared, which in turn may be used to form an in-situ polymerized polymer electrolyte.

In some examples, the mass ratio of the first monomer and the second monomer is 20:0.5-20:10, for example 20:2-20:5, most preferably 20:3-20:5.

The present invention further provides a polymer electrolyte precursor raw material composition for preparing a polymer electrolyte precursor composition capable to form an in-situ polymerized polymer electrolyte, which comprises, consists essentially of, or consists of:
A) monomers of the present invention; and
B) a free radical initiator for thermal polymerization reaction of the monomers.

The present invention further provides a polymer electrolyte precursor composition capable to form an in-situ polymerized polymer electrolyte, which comprises, consists essentially of, or consists of:
A) monomers of the present invention;
B) a free radical initiator for thermal polymerization reaction of the monomers; and
C) a lithium salt, preferably lithium bis(trifluoromethanesulfonyl)imide; and
D) optionally an organic solvent, preferably ethylene carbonate/dimethyl carbonate, with an amount of 0%-70 wt. %, preferably 10%-60 wt. %, more preferably 20%-50 wt. % based on the total weight of the polymer electrolyte precursor composition.

Preferably, the amount of the monomers is 5-80 wt. %, for example, 10-80 wt. %, 20-80 wt. %, more preferably 25-75 wt. % based on the total weight of the polymer electrolyte precursor composition. Preferably, the mass ratio of the first monomer and the second monomer is 20:0.5-20:10, most preferably 20:3-20:5.

Preferably, the polymer electrolyte precursor composition comprises an organic solvent.

The method for preparing the polymer electrolyte precursor composition capable to form an in-situ polymerized polymer electrolyte of the invention may be conventional, for example a method comprising the step of mixing the components of the polymer electrolyte precursor composition.

The present invention further provides a method to in-situ prepare a polymer electrolyte, comprising the steps as follows,
1) injecting the polymer electrolyte precursor composition of the invention into a battery case, followed by sealing; and
2) polymerizing in-situ the polymer electrolyte precursor composition by heating.

In one example, the reaction of the first monomer and the second monomer may be schematically shown as follows, Scheme 1

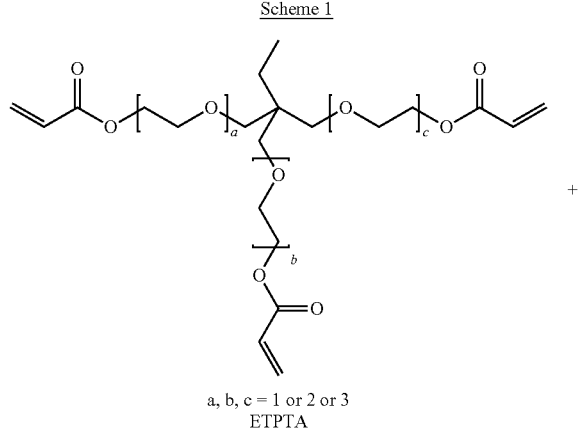

a, b, c = 1 or 2 or 3
ETPTA

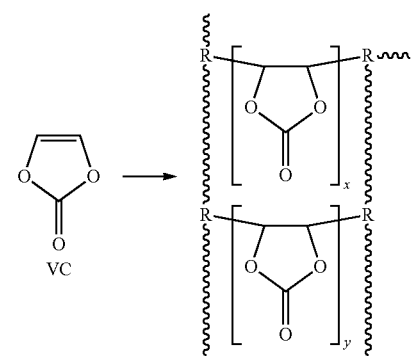

*R = ETPTA
3D cross-linked electrolyte

The present invention further provides a polymer electrolyte, especially a gel polymer electrolyte, wherein the polymer electrolyte is formed by (polymerization of) a polymer electrolyte precursor composition comprising the first monomer and second monomer of the invention, particularly the monomers of the invention.

The present invention further provides a polymer electrolyte for rechargeable batteries, comprising a polymer which is the reaction product of the monomers of the invention with a free radical initiator.

The present invention further provides a polymer electrolyte for rechargeable batteries, comprising:
(i) a polymer which is the reaction product of the monomers of the invention with a free radical initiator, and
(ii) an organic solvent which contains an amount of an ionic salt effective to achieve an ionic conductivity of about 0.44 mS/cm or less.

In some examples, the ionic salt is a lithium salt.

In some examples, the amount of the monomers is 20-80 wt. %, preferably 25-75 wt. % based on the total weight of the polymer electrolyte precursor composition.

Based on the total weight of the polymer electrolyte precursor composition, when the amount of lithium salt is around 25 wt. %, if the amount of the first monomer and the second monomer is above around 75 wt. %, the polymer electrolyte formed by the composition will be in all-solid state; if the amount of the first monomer and the second monomer is below around 25 wt. %, the polymerization of the monomer will not be satisfactory and cannot form a good gel state. Thus, based on the total weight of the polymer electrolyte precursor composition, when the amount of lithium salt is around 25 wt. %, the amount of the first monomer and the second monomer is preferably <75 wt. % and >25 wt. % based on the total weight of the polymer electrolyte composition or polymer electrolyte precursor composition.

The present invention further provides a polymer electrolyte prepared in-situ by the polymer electrolyte precursor composition according to the invention. The polymer electrolyte may be prepared according to the conventional methods in the art.

The present invention further provides a rechargeable battery comprising an anode, a cathode, a microporous separator separating said anode and said cathode, and a gel polymer electrolyte of the present invention.

The present invention further provides a lithium ion battery comprising the polymer electrolyte prepared in-situ by (polymerization of) the polymer electrolyte precursor composition according to the invention.

The present invention further provides an electrochemical device comprising the polymer electrolyte according to the present invention.

In some examples, the electrochemical device is a secondary battery.

The present invention further provides a device fabricated by a process comprising:
preparing an installed battery case with an electrode assembly;
injecting the polymer electrolyte precursor composition of the invention into the battery case, followed by sealing; and
polymerizing the polymer electrolyte precursor composition.

The polymerizing may be performed by heating.

The polymer electrolyte of the invention may be either in gel state (i.e., gel polymer electrolyte) or solid state (i.e., solid polymer electrolyte), preferably, the polymer electrolyte is in gel state. For the polymer electrolyte precursor composition of the invention, the gel or solid state of the polymer electrolyte may be adjusted by the amount of organic solvent in the polymer electrolyte precursor composition. For example, as shown in the Examples 1-3, when the polymer electrolyte precursor composition comprises no organic solvent, the obtained polymer electrolyte is in solid state; when the polymer electrolyte precursor composition comprises organic solvent for example 10%-70 wt. %, the obtained polymer electrolyte is in gel state.

There is no special limitation to the types of lithium ion batteries that may use the electrolyte of the present invention. Particularly, the lithium ion batteries are LMBs.

The present invention further provides use of the monomers of the invention, or the polymer electrolyte precursor raw material composition of the invention, or the polymer electrolyte precursor composition of the invention, in preparation of an in-situ polymerized polymer electrolyte or an electrochemical device.

A person skilled in the art can determine suitable separators for the lithium ion batteries with the polymer electrolyte of the invention. For example, the separator may be surface modified or unmodified; the separator may have a thickness of less than 30 μm, even less than 20 μm; the porosity of the separator may be above 70%, even above 80%; the material of the separator may be e.g. cellulose or polytetrafluoroethylene (PTFE).

First Monomer

In some examples, the carbonated ester monomer is preferably vinylene carbonate (VC), with chemical formula: $C_3H_2O_3$, and CAS login No. 872-36-6.

Second Monomer

The second monomer is preferably trimethylolpropane ethoxylate triacrylate (ETPTA), or other monomers with similar molecule structure with ETPTA such as trimethylolpropane triacrylate (TMPTA), pentaerythritol triacrylate (PETA) and so on.

The trimethylolpropane ethoxylate triacrylate (ETPTA) may have an average Mn of around 428 and a CAS login No. 28961-43-5.

Free Radical Initiator

The free radical initiator of the polymerization reaction of the monomers is for the thermal polymerization reaction of the monomers, and may be those conventional in the art.

Examples of free radical initiator or the polymerization initiator may include azo compounds such as 2,2-azobis(2-cyanobutane), 2,2-azobis(methylbutyronitrile), 2,2'-azoisobutyronitrile (AIBN), azobisdimethyl-valeronitrile (AMVN) and the like, peroxy compounds such as benzoyl peroxide, acetyl peroxide, dilauryl peroxide, di-tert-butyl peroxide, cumyl peroxide, hydrogen peroxide and the like, and hydroperoxides. Preferably, AIBN, 2,2'-azobis(2,4-dimethyl valeronitrile) (V65), Di-(4-tert-butylcyclohexyl)-peroxydicarbonate (DBC), or the like may also be employed.

Preferably the free radical initiator may be selected from azobisisobutyronitrile (AIBN), azobisisoheptanenitrile (ABVN), benzoyl peroxide (BPO), lauroyl peroxide (LPO) and so on. More preferably, the free radical initiator is azobisisobutyronitrile (AIBN).

The amount of the free radical initiator is conventional. Preferably the amount of the free radical initiator is 0.1-3 wt. %, more preferably around 0.5 wt. % based on the total weight of the monomers.

The polymerization initiator is decomposed at a certain temperature of 40 to 80° C. to form radicals, and may react with monomers via the free radical polymerization to form a gel polymer electrolyte. Generally, the free radical polymerization is carried out by sequential reactions consisting of the initiation involving formation of transient molecules having high reactivity or active sites, the propagation involving re-formation of active sites at the ends of chains by addition of monomers to active chain ends, the chain transfer involving transfer of the active sites to other molecules, and the termination involving destruction of active chain centers.

Lithium Salt

The lithium salt is a material that is dissolved in the non-aqueous electrolyte to thereby resulting in dissociation of lithium ions.

The lithium salt may be those used conventional in the art, non-limiting examples may be at least one selected from lithium bis(trifluoromethanesulfonyl)imide (LiTFSI), lithium hexafluorophosphate ($LiPF_6$), lithium difluorooxalate borate (LiODFB), $LiAsF_6$, $LiClO_4$, $LiN(CF_3SO_2)_2$, $LiBF_4$, $LiSbF_6$, and LiCl, LiBr, LiI, $LiB_{10}Cl_{10}$, $LiPF_6$, $LiCF_3SO_3$, $LiCF_3CO_2$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide. The lithium salt is preferably lithium bis(trifluoromethanesulfonyl)imide. These materials may be used alone or in any combination thereof.

The amount of lithium salt is also conventional, for example 5-40 wt. %, most preferably around 25 wt. % based on the total weight of the polymer electrolyte precursor composition.

Organic Solvent

The organic solvent may be conventional in the art. For example, the organic solvent may be non-protic organic solvents such as N-methyl-2-pyrollidinone, propylene carbonate (PC), ethylene carbonate (EC), butylene carbonate (BC), dimethyl carbonate (DMC), diethyl carbonate (DEC), ethylmethyl carbonate (EMC), gamma-butyrolactone, 1,2-dimethoxy ethane, tetrahydroxy furan, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate. These materials may be used alone or in any combination thereof.

In some examples, the organic solvent is selected from ethylene carbonate/dimethyl carbonate (EC/DMC), propylene carbonate (PC), triethylene glycol dimethyl ether (TEGDME) and so on. In some examples, the organic solvent is preferably ethylene carbonate/dimethyl carbonate (EC/DMC, EC/DMC=50/50 (v/v)).

The amount of the organic solvent is conventional. For example, the amount of the organic solvent may be 0%-70 wt. %, for example 0%-65 wt. %, 0%-60 wt. %, 0%-55 wt. %, 5%-70 wt. %, 5%-65 wt. %, 5%-60 wt. %, 5%-55 wt. %, preferably 10%-70 wt. %, 10%-65 wt. %, 10%-60 wt. %, 10%-55 wt. %, more preferably 20%-50 wt. % based on the total weight of the polymer electrolyte precursor composition.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride.

The electrochemical device encompasses all kinds of devices that undergo electrochemical reactions. Examples of the electrochemical device include all kinds of primary batteries, secondary batteries, fuel cells, solar cells, capacitors and the like, preferably secondary batteries.

Generally, the secondary battery is fabricated by inclusion of the electrolyte in an electrode assembly composed of a cathode and an anode, which are faced opposite to each other with a separator therebetween.

The cathode is, for example, fabricated by applying a mixture of a cathode active material, a conductive material and a binder to a cathode current collector, followed by drying and pressing. If necessary, a filler may be further added to the above mixture.

The cathode current collector is generally fabricated to have a thickness of 3 to 500 μm. There is no particular limit to materials for the cathode current collector, so long as they have high conductivity without causing chemical changes in the fabricated battery. Examples of the materials for the cathode current collector may include stainless steel, aluminum, nickel, titanium, sintered carbon, and aluminum or stainless steel which was surface-treated with carbon, nickel, titanium or silver. The current collector may be fabricated to have fine irregularities on the surface thereof so as to enhance adhesion to the cathode active material. In addition, the current collector may take various forms including films, sheets, foils, nets, porous structures, foams and non-woven fabrics.

Examples of the cathode active materials that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithium nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$, $LiFe_3O_4$, etc.

The conductive material is typically added in an amount of 1 to 50% by weight, based on the total weight of the mixture including the cathode active material. There is no particular limit to the conductive material, so long as it has suitable conductivity without causing chemical changes in the fabricated battery. Examples of conductive materials may include conductive materials including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component assisting in binding between the active material and conductive material, and in binding with the current collector. The binder is typically added in an amount of 1 to 50% by weight, based on the total weight of the mixture including the cathode active material. Examples of the binder may include polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber and various copolymers.

The filler is an optional ingredient used to inhibit cathode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fiber and carbon fiber. The anode is fabricated by applying an anode active material to the anode current collector, followed by drying. If necessary, other components as described above may be further included.

The anode current collector is generally fabricated to have a thickness of 3 to 500 μm. There is no particular limit to materials for the anode current collector, so long as they have suitable conductivity without causing chemical changes in the fabricated battery. Examples of materials for the anode current collector may include copper, stainless steel, aluminum, nickel, titanium, sintered carbon, copper or stainless steel having a surface treated with carbon, nickel, titanium or silver, and aluminum-cadmium alloys. Similar to the cathode current collector, the anode current collector may also be processed to form fine irregularities on the surfaces thereof so as to enhance adhesive strength to the anode active material. In addition, the anode current collector may be used in various forms including films, sheets, foils, nets, porous structures, foams and non-woven fabrics.

Examples of the anode active materials utilizable in the present invention include carbon such as non-graphitizing carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb or Ge; Me': Al, B, P, Si, Group I, Group II and Group III elements of the Periodic Table of the Elements, or halogens; $0 \leq x \leq 1$; $1 \leq y \leq 3$; and $1 \leq z \leq 8$); lithium metals; lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni based materials.

The secondary battery according to the present invention may be, for example, a lithium metal secondary battery, a lithium-ion secondary battery, a lithium polymer secondary battery, lithium-ion polymer secondary battery or the like. The secondary battery may be fabricated in various forms. For example, the electrode assembly may be constructed in a jelly-roll structure, a stacked structure, a stacked/folded structure or the like. The battery may take a configuration in which the electrode assembly is installed inside a battery case of a cylindrical can, a prismatic can or a laminate sheet including a metal layer and a resin layer. Such a configuration of the battery is widely known in the art.

In some examples, the invention provides a polymer electrolyte precursor composition capable to form a polymer electrolyte, comprising, consisting essentially of, or consisting of:
  A) monomers consisting of vinylene carbonate (VC) and trimethylolpropane ethoxylate triacrylate (ETPTA);
  B) a free radical initiator, with an amount of around 0.5 wt. % based on the total weight of the vinylene carbonate and trimethylolpropane ethoxylate triacrylate;
  C) lithium bis(trifluoromethanesulfonyl)imide; and
  D) ethylene carbonate/dimethyl carbonate (EC/DMC);
wherein the amount of the VC and ETPTA is 25-75 wt. % based on the total weight of the polymer electrolyte precursor composition; and the mass ratio of VC and ETPTA is around 20:2-20:5.

The amount of lithium bis(trifluoromethanesulfonyl)imide is preferably around 25 wt. % based on the total weight of the polymer electrolyte precursor composition. The amount of ethylene carbonate/dimethyl carbonate is preferably 0%-50 wt. % based on the total weight of the polymer electrolyte precursor composition.

Figure 2:
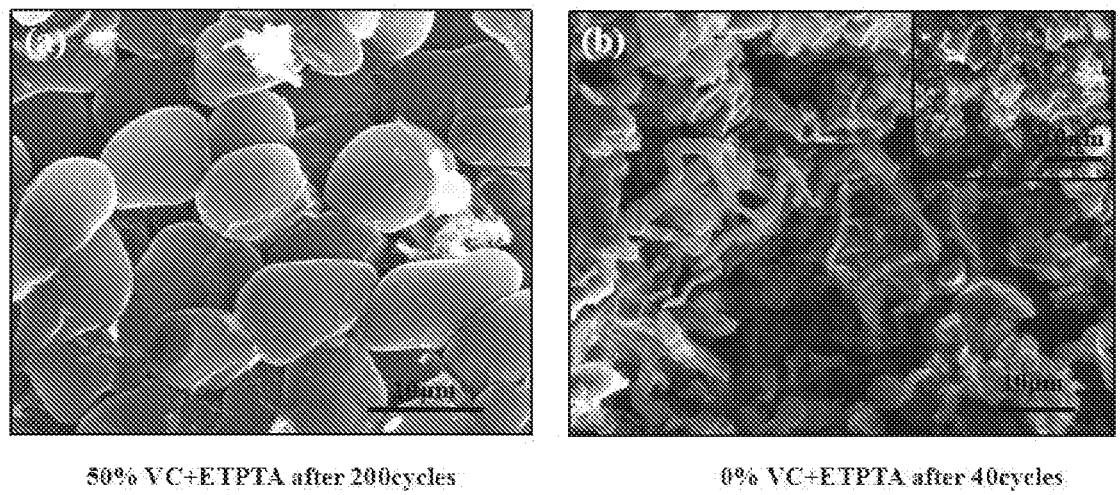
FIG. 2 shows the scanning electron microscope (SEM) images of Li foil after cycled with the electrolytes prepared in Example 2 (FIG. 2(a)) and Comparative Example 1 (FIG. 2(b)), respectively.

Therefore, the present invention provides a novel polymer electrolyte by in-situ polymerization of the polymer electrolyte precursor composition of the invention. The polymer electrolyte may be prepared in-situ and the thickness of the electrolyte may be conveniently controlled. Besides, the combination of the monomers, e.g. the first monomer and the second monomer form an excellent polymer skeleton, which shows excellent cycle performance and higher electrochemical stability window as compared with that of commercial liquid electrolyte. Furthermore, the polymer electrolyte is non-flammable, indicating that it is safer than traditional liquid electrolyte. In addition, when lithium metal is used as anode, lithium dendrite formation can be inhibited owing to the electrolyte's superior mechanical properties as shown in FIG. 2. The electrolyte also eliminates the consumption of a large amount of solvents in traditional lithium metal batteries, thus the electrolyte is especially suitable for use in LMBs. Compared with traditional PEO-based polymer electrolyte, the polymer electrolyte of the invention showed superior ionic conductivity, wider electrochemical window and better cycle performance.

Other advantages of the present invention would be apparent for a person skilled in the art upon reading the specification.

To describe the content and effects of the present invention in detail, the present invention will be further described below in combination with the examples and comparative example and with the related drawings.

Preparation of a Lithium Metal Battery

The lithium metal batteries were prepared according to the following method:
  Step a) preparation of electrolyte precursor composition solution; and
  Step b) assembly of a lithium metal battery and in-situ polymerization by heating.

Steps a) and b) were performed in a glove box filled with argon gas ($H_2O$, $O_2 \leq 0.5$ ppm).

Example 1

1) Preparation of Precursor Electrolyte Solution:

0.098 g trimethylolpropane ethoxylate triacrylate (ETPTA, average Mn~428), 0.652 g vinylene carbonate (VC), 1.5 g EC/DMC (EC/DMC=50/50 (v/v)), 0.75 g LiTFSI and 3.75 mg AIBN were mixed and stirred at 25° C. for 0.5 h to obtain a precursor electrolyte solution.

2) Cell Assembly and In-Situ Polymerization by Heating:

A $LiFePO_4$ (LFP) cathode was prepared as follows. LFP, acetylene black, and poly(vinylidene difluoride) in the weight ratio of 80:10:10 were mixed to form a viscous slurry. Then, a flat carbon-coated aluminum foil was coated with the viscous slurry by the doctor blade process. The carbon-coated aluminum foil coated with the viscous slurry was dried at 70° C. for 1 hour in an air-circulating oven and further dried at 100° C. under high vacuum for 12 h to obtain a $LiFePO_4$ cathode. The mass loading of active material ($LiFePO_4$) was 5.3-6.2 mg cm$^{-2}$. The precursor electrolyte solution was injected into a 2032 lithium battery with a cellulose separator which separated cathode and anode (Li foil), then the cells were heated at 60° C. for 8 h and then 80° C. for 4 h.

After the heating process, polymer electrolyte of gel state without flowable liquid phase between the anode and cathode could be obtained. The gel state of polymer electrolyte could be confirmed as the 2032 battery was disassembled.

Fourier transform infrared spectroscopy (FTIR) was further conducted to analyze the chemical structure of the gel polymer electrolyte. As can be seen from FIG. 1, after polymerization, the absorption peak at 3166 cm$^{-1}$ disappeared which was well assigned to the chemical structure change of the C=C double bond into C—C single bond.

Example 2

1) Preparation of Precursor Electrolyte Solution:
0.1956 g trimethylolpropane ethoxylate triacrylate (ETPTA, average Mn-428), 1.3043 g vinylene carbonate (VC), 0.75 g EC/DMC, 0.75 g LiTFSI and 7.5 mg AIBN were mixed and stirred at 25° C. for 0.5 h.
2) Cell Assembly and In-Situ Polymerization by Heating was Conducted According to the Same Method as Example 1.

After the heating process, polymer electrolyte of gel state without flowable liquid phase between the anode and cathode could be obtained. The gel state of polymer electrolyte could be confirmed as the 2032 battery was disassembled.

Example 3

1) Preparation of Precursor Electrolyte Solution:
0.2935 g trimethylolpropane ethoxylate triacrylate (ETPTA, average Mn~428), 1.9565 g vinylene carbonate (VC), 0.75 g LiTFSI and 11.25 mg AIBN were mixed and stirred at 25° C. for 0.5 h.
2) Cell Assembly and In-Situ Polymerization by Heating was Conducted According to the Same Method as Example 1.

After the heating process, polymer electrolyte of solid state could be obtained. The solid state of polymer electrolyte could be confirmed as the 2032 battery was disassembled.

Comparative Example 1

Figure 3:
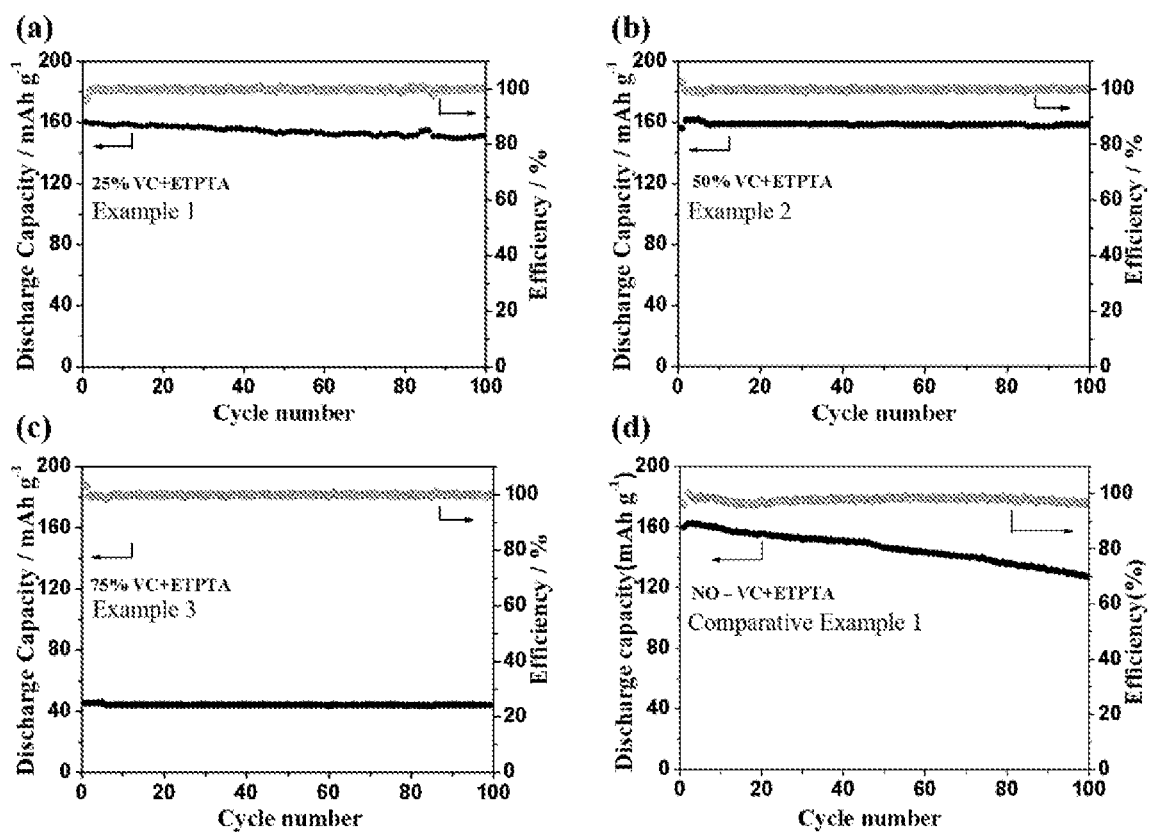
FIG. 3 shows the cycle performance of the electrolytes prepared in Example 1, Example 2, Example 3 and Comparative Example 1 at 0.5C rate.

Cell Assembly:
The commercial liquid electrolyte 1M LiPF$_6$ in EC/DMC (v/v 1/1) was injected into a 2032 lithium battery with polypropylene (PP) separator which separated cathode and anode in which cathode and anode were the same with Example 1.
Performance Tests
1. Cycle Performance of the Electrolyte
The cycle performance of cells was evaluated by using LiFePO$_4$ as the cathode and Li metal as the anode at room temperature on a LAND battery testing system (Wuhan Kingnuo Electronics Co., Ltd., China). The cut-off voltage was 4.2 V versus Li/Li$^+$ for charge (Li extraction) and 2.4 V versus Li/Li$^+$ for discharge (Li insertion). All the related cells would be activated by a small current before cycling. The C rates in all of the electrochemical measurements were defined based on 1 C=160 mA g$^{-1}$. The test results are shown in FIG. 3. In FIG. 3, the solid points represents discharge capacity and the hollow points represents coulombic efficiency.
For FIG. 3, all cells were evaluated at 0.5 C rate. The discharge capacity of the cells Comparative Example 1 decreased rapidly after cycle for 100 times with capacity retention of 77.9%, and coulombic efficiency of the electrolytes of Comparative Example 1 was lower than 99% and even decreased to 96.5% after cycled for 100 times. The cycling performance with polymer electrolyte of Example 1, Example 2 and Example 3 exhibited obviously more outstanding cycle performance as their discharge capacity did not decrease obviously like Comparative Example 1 and the capacity retention of Example 1, Example 2 and Example 3 were 93.97, 98.7% and 97.3% respectively, with coulombic efficiency of >99% as shown in Table 1, which meant that the polymer electrolytes prepared in Example 1, Example 2 and Example 3 of the invention had a significantly superior effect on the cycle performance. However, the cells with all solid-state polymer electrolyte prepared in Example 3 exhibited much lower discharge capacity due to low ionic conductivity.

TABLE 1

| Discharge rate (C) | Capacity retention (%) | | | |
| --- | --- | --- | --- | --- |
| | Example 1 | Example 2 | Example 3 | Comparative Example 1 |
| 0.5 | 93.97 | 98.7 | 97.3 | 77.9 |

2. Electrochemical Stability Window

The electrochemical stability of polymer electrolyte of the invention and the liquid electrolyte of Comparative Example 1 was evaluated by linear sweep voltammetry (LSV) performed with SS (stainless steel)/gel-polymer electrolyte (GPE)/Li coin cell at a scan rate of 10 mV S$^{-1}$ from open circuit voltage of each cell to 5 V vs. Li$^+$/Li at room temperature in a CHI760e electrochemical workstation (Shanghai Chenhua Instruments Co., Ltd., China). The results obtained by the test are shown in FIG. 4.

Figure 4:
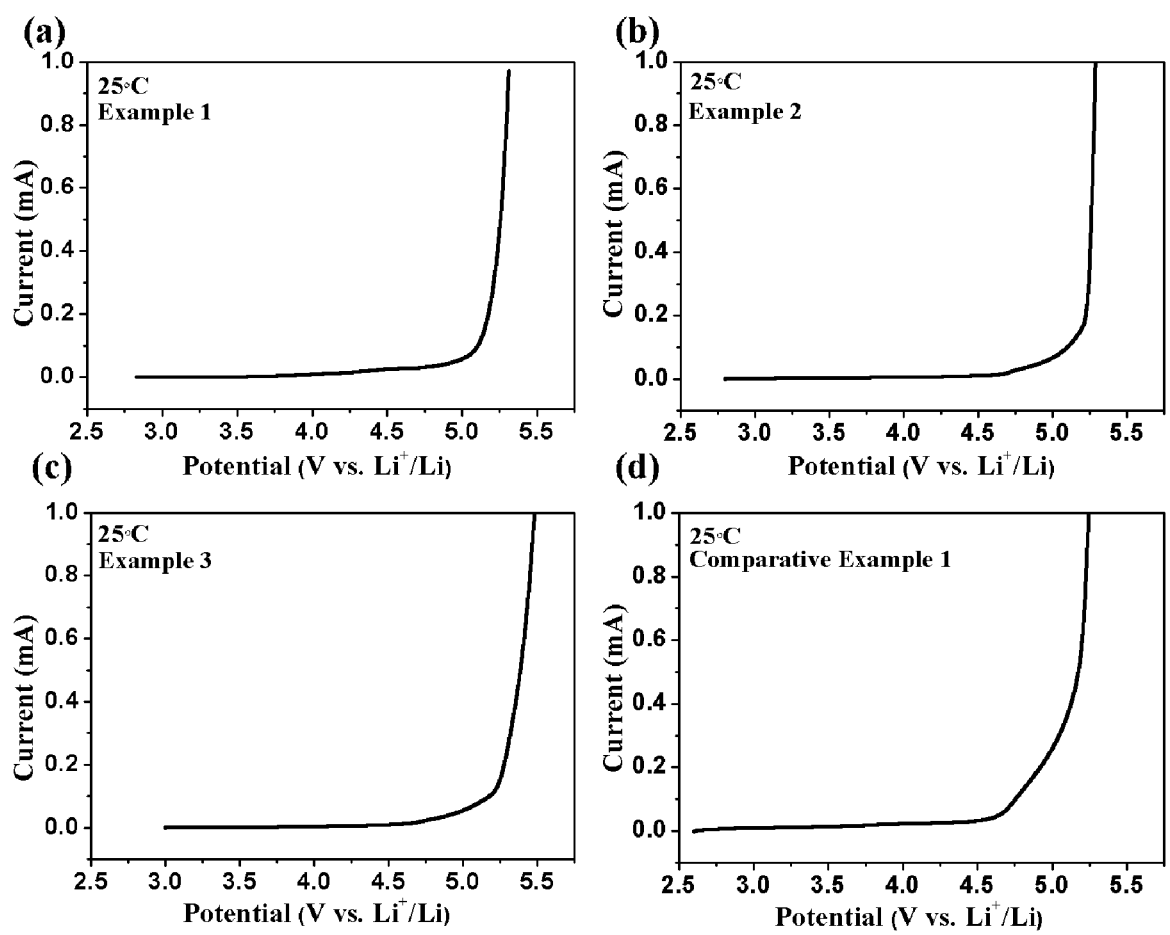
FIG. 4 shows the electrochemical stability window test result of the polymer electrolyte prepared in Example 1, Example 2, Example 3, and Comparative Example 1.

FIG. 4 shows the electrochemical stability window of the polymer electrolytes and liquid electrolyte. The liquid electrolyte of Comparative Example 1 showed an electrochemical stability window of approximately 4.6 V. Obviously, the polymer electrolytes had higher electrochemical stability windows than that of the liquid electrolyte. The polymer electrolytes of Example 1, Example 2 and Example 3 according to the present invention showed a very stable electrochemical stability window of approximately 5V, which could contribute to better electrochemical performance. A very stable electrochemical stability window of approximately 5V is very important, which makes it possible to use novel high-nickel content cathodes in batteries.

3. Ionic Conductivity

Figure 5:
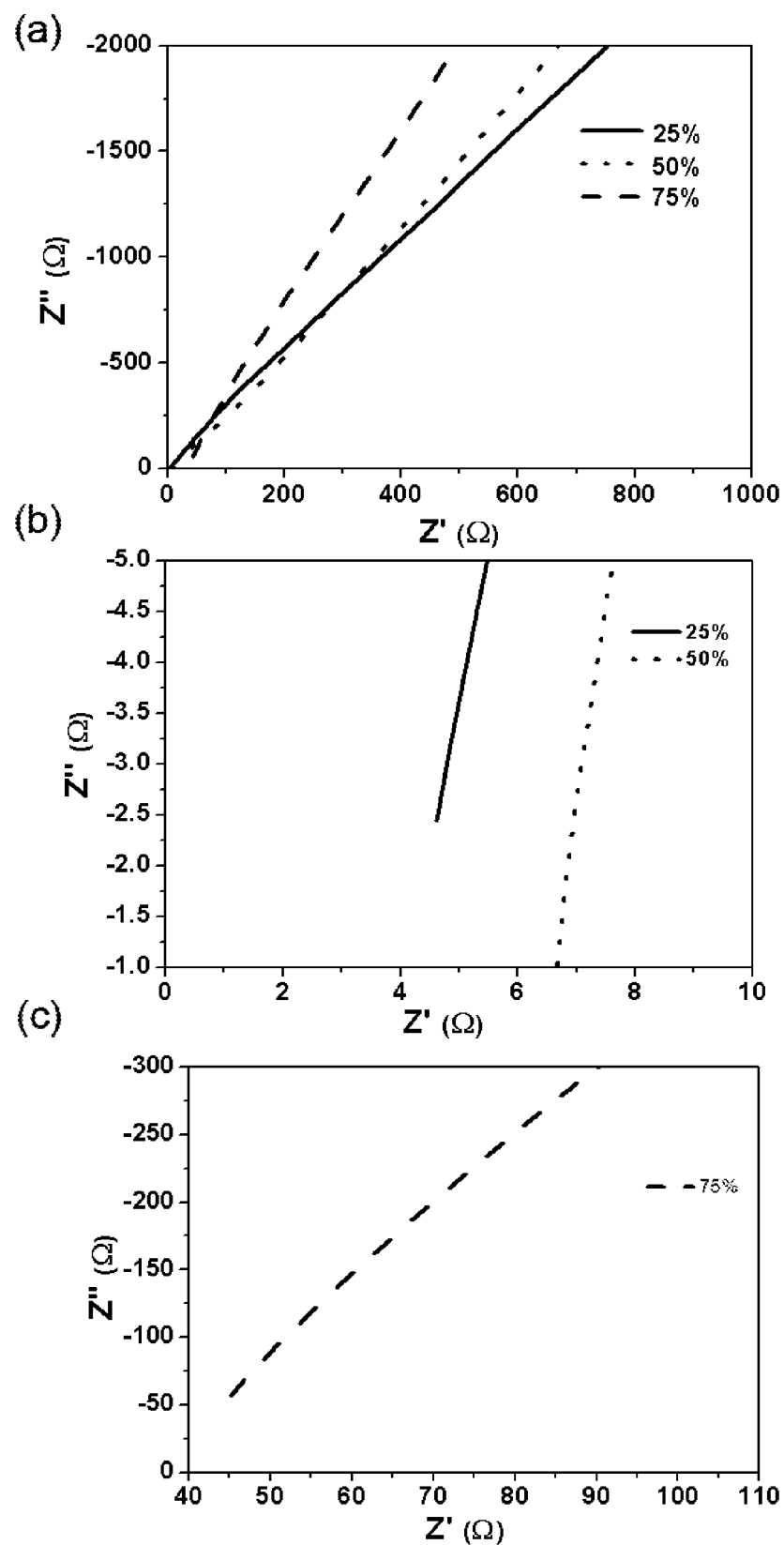
FIG. 5 shows the ionic conductivity of the polymer prepared in Example 1 (25%), Example 2(50%) and Example 3(75%).

Alternating current (AC) impedance spectroscopy was measured in the CHI760e electrochemical workstation. The electronic conductivity of gel-polymer electrolyte was measured by SS/GPE/SS cell with an applied voltage of 5 mV and the results were shown in FIG. 5 and the ionic conductivity of the examples were calculated based on FIG. 5 and summarized in Table 2 below.

TABLE 2

| | Example 1 | Example 2 | Example 3 | Comparative Example 1 |
| --- | --- | --- | --- | --- |
| ionic conductivity (mS/cm) | 0.44 | 0.31 | 0.045 | 6.35 |

Compared with the PVCA polymer electrolyte disclosed in J. Chai et al. (J. Chai et al. Advance Science, Vol. 4(2016), pp. 1600377) manifested that poly(vinylene carbonate) (PVCA), which disclosed a PVCA polymer electrolyte with ionic conductivity of $1.95 \times 10^{-5}$ S/cm at room temperature, the ionic conductivity of the solid polymer electrolyte of the invention ($4.5 \times 10^{-5}$ S/cm in Example 3) is higher. Also, the ionic conductivity is much higher than that of traditional PEO-based polymer electrolyte which can only offer a very low ionic conductivity of about $2.1 \times 10^{-6}$ S/cm (K. Wen et al. J. Mater. Chem. A, Vol. 6 (2018), pp 11631-11663). Furthermore, the ionic conductivities of the gel polymer electrolyte in Example 1 and Example 2 were comparable to the PVCA-based gel polymer electrolyte of prior art. (J. Chai et al. ACS Apply Material Interfaces, Vol. 9 (2017), pp 17897-17905).

4. Lithium Dendrite Formation Inhibition

After cycled for 200 times, the Li|GPE|LiFePO$_4$ cell using in-situ polymerized gel polymer electrolyte of Example 2 was disassembled in an argon glove box and then the cycled Li foil was immersed in dimethoxyethane (DME) for about 2 hours to remove LiTFSI. For comparation, Li foil cycled for 40 times in commercial electrolyte (Comparative example 1) was processed the same method as above. Then, the prepared Li foil samples were observed by SEM (Nova Nano SEM 230, FEI Company, U.S.A.).

As shown in FIG. 2(a), the Li foil cycled in gel polymer electrolyte exhibited dense cobblestone structure with particle size of 10-15 μm which indicated uniform lithium deposition during cycles, and no lithium dendrites were detected. While after cycled in commercial liquid electrolyte for about only 40 times, Li dendrites could be observed obviously as shown in FIG. 2(b) and loose lithium deposition could be observed as shown in the small image on the upper right corner of FIG. 2(b). Both Li dendrite and pulverized Li are harmful to batteries. The results indicated that the gel polymer electrolyte can effectively inhibit the formation of Li dendrite and suppress the pulverization of lithium foil.

Therefore, using the polymer electrolyte, lithium dendrite formation can be inhibited in LIBs with lithium metal anode, owing to the electrolyte's superior mechanical properties.

As used herein, terms such as "comprise(s)" and the like as used herein are open terms meaning 'including at least' unless otherwise specifically noted.

All references, tests, standards, documents, publications, etc. mentioned herein are incorporated herein by reference. Where a numerical limit or range is stated, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. Monomers for preparing a polymer electrolyte precursor composition capable to form an in-situ polymerized polymer electrolyte, which consists of:
   A1) a first monomer represented by formula (I);

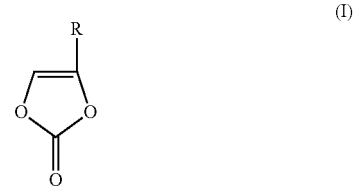

wherein R represents H, F, methyl or ethyl; and
   A2) a second monomer, represented by formula (II);

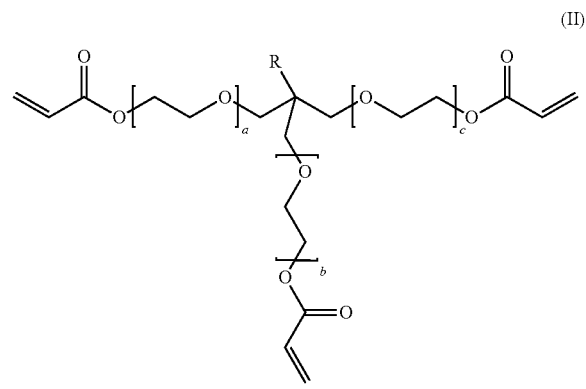

wherein R represents methyl, —CH$_2$OH, ethyl, or —CH$_2$CH$_2$OH; a, b, c each independently represents 0, 1, 2 or 3, and a+b+c≥2;
   wherein the mass ratio of the first monomer and the second monomer is 20:0.5-20:10.

2. A polymer electrolyte precursor raw material composition for preparing a polymer electrolyte precursor composition capable to form an in-situ polymerized polymer electrolyte, which consists of:
   A) monomers of claim 1; and
   B) a free radical initiator for thermal polymerization reaction of the monomers.

3. A polymer electrolyte precursor composition capable to form an in-situ polymerized polymer electrolyte, which consists of:
   A) monomers of claim 1;
   B) a free radical initiator for thermal polymerization reaction of the monomers; and
   C) a lithium salt, preferably lithium bis(trifluoromethanesulfonyl) imide.

4. The polymer electrolyte precursor composition of claim 3, wherein the amount of the monomers is 5-80 wt. % based on the total weight of the polymer electrolyte precursor composition.

5. A method to in-situ prepare a polymer electrolyte, comprising the steps as follows:
   1) injecting the polymer electrolyte precursor composition of claim 3 into a battery case with an electrode assembly, followed by sealing; and
   2) Polymerizing in-situ the polymer electrolyte precursor composition by heating.

6. A polymer electrolyte, wherein the polymer electrolyte is formed by a polymer electrolyte precursor composition of claim 3.

7. A polymer electrolyte for rechargeable batteries, comprising a polymer which is the reaction product of the monomers of claim 1 with a free radical initiator.

8. A polymer electrolyte for rechargeable batteries, comprising:
   (i) a polymer which is the reaction product of the monomers of claim 1 with a free radical initiator, and
   (ii) an organic solvent which contains an amount of an ionic salt effective to achieve an ionic conductivity of about 0.44 mS/cm or less.

9. A rechargeable battery comprising an anode, a cathode, a microporous separator separating said anode and said cathode, and a gel polymer electrolyte according to claim 6.

10. A lithium ion battery comprising the polymer electrolyte prepared in-situ by the polymer electrolyte precursor composition of claim 3.

11. An electrochemical device comprising the polymer electrolyte according to claim 6.

12. A device fabricated by a process comprising:
   preparing an installed battery case with an electrode assembly;
   injecting the polymer electrolyte precursor composition of claim 3 into the battery case, followed by sealing; and
   polymerizing the polymer electrolyte precursor composition.

13. A polymer electrolyte precursor composition capable to form a polymer electrolyte, consisting of:
   A) monomers consisting of vinylene carbonate and trimethylolpropane ethoxylate triacrylate;
   B) a free radical initiator, with an amount of 0.1-3 wt. % based on the total weight of the vinylene carbonate and trimethylolpropane ethoxylate triacrylate;
   C) lithium bis(trifluoromethanesulfonyl) imide; and
   D) ethylene carbonate/dimethyl carbonate;
wherein the amount of the vinylene carbonate and trimethylolpropane ethoxylate triacrylate is 25-75 wt. % based on the total weight of the polymer electrolyte precursor composition; and the mass ratio of vinylene carbonate and trimethylolpropane ethoxylate triacrylate is around 20:2-20:5.

14. Monomers for preparing a polymer electrolyte precursor composition capable to form an in-situ polymerized polymer electrolyte of claim 1, wherein the first monomer is vinylene carbonate.

15. Monomers for preparing a polymer electrolyte precursor composition capable to form an in-situ polymerized polymer electrolyte of claim 1, wherein the second monomer is trimethylolpropane ethoxylate triacrylate.

16. Monomers for preparing a polymer electrolyte precursor composition capable to form an in-situ polymerized polymer electrolyte of claim 1, wherein $a+b+c \geq 3$.

17. Monomers for preparing a polymer electrolyte precursor composition capable to form an in-situ polymerized polymer electrolyte of claim 1, wherein the mass ratio of the first monomer and the second monomer is 20:3-20:5.

18. The polymer electrolyte of claim 3, wherein the lithium salt is bis(trifluoromethanesulfonyl) imide.

19. The polymer electrolyte of claim 3, further comprising an organic solvent with an amount of 0%-70 wt. % based on the total weight of the polymer electrolyte precursor composition.

20. The polymer electrolyte of claim 19, wherein the organic solvent is ethylene carbonate/dimethyl carbonate.

21. The polymer electrolyte of claim 19, wherein the amount of the organic solvent is 20%-50 wt. % based on the total weight of the polymer electrolyte precursor composition.

* * * * *